April 16, 1963 T. M. ADMERAND 3,085,529
APPARATUS FOR FORMING FLEXIBLE CONDUIT
Filed April 29, 1958 2 Sheets-Sheet 1
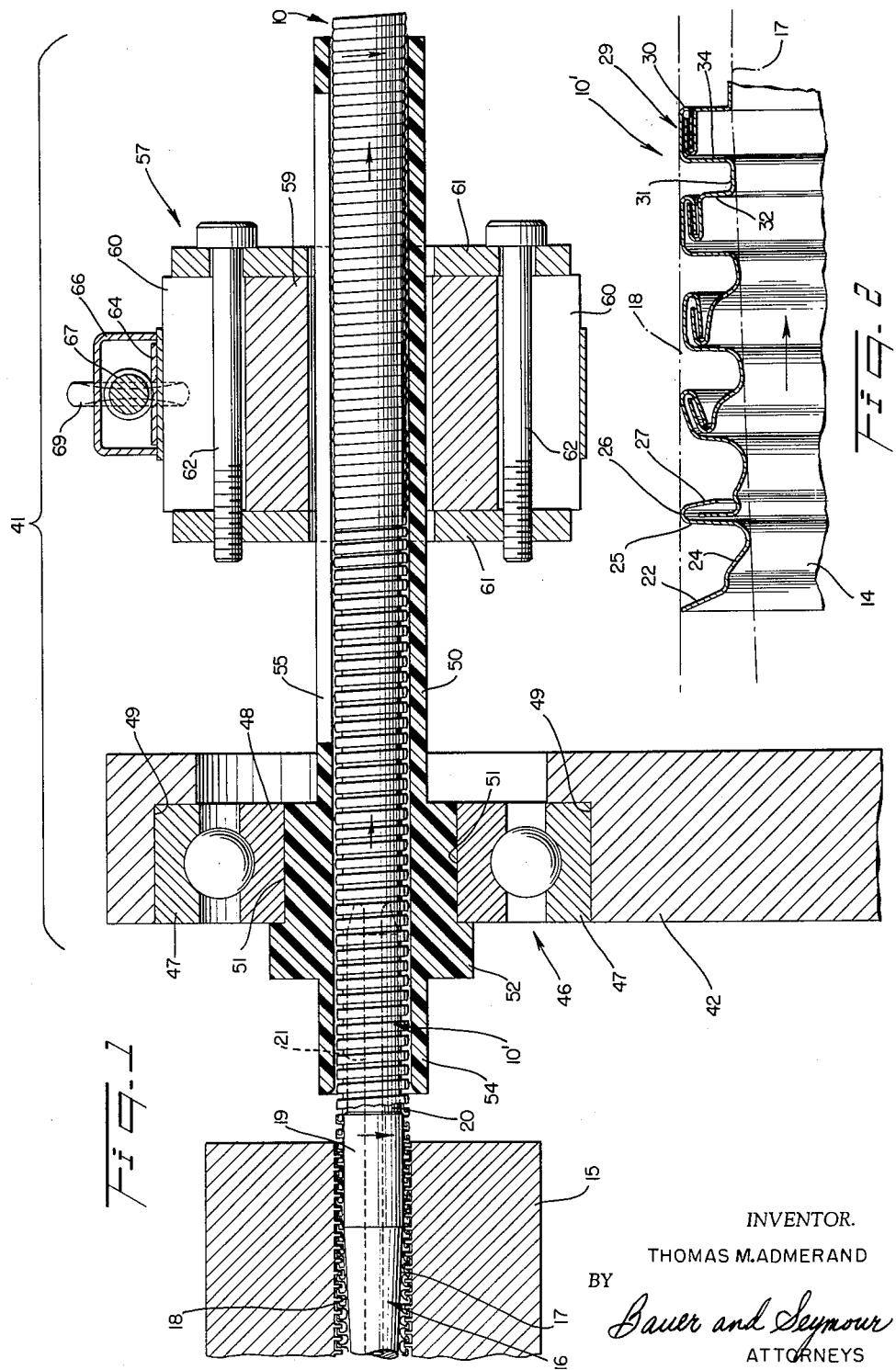
INVENTOR.
THOMAS M. ADMERAND
BY
*Bauer and Seymour*
ATTORNEYS

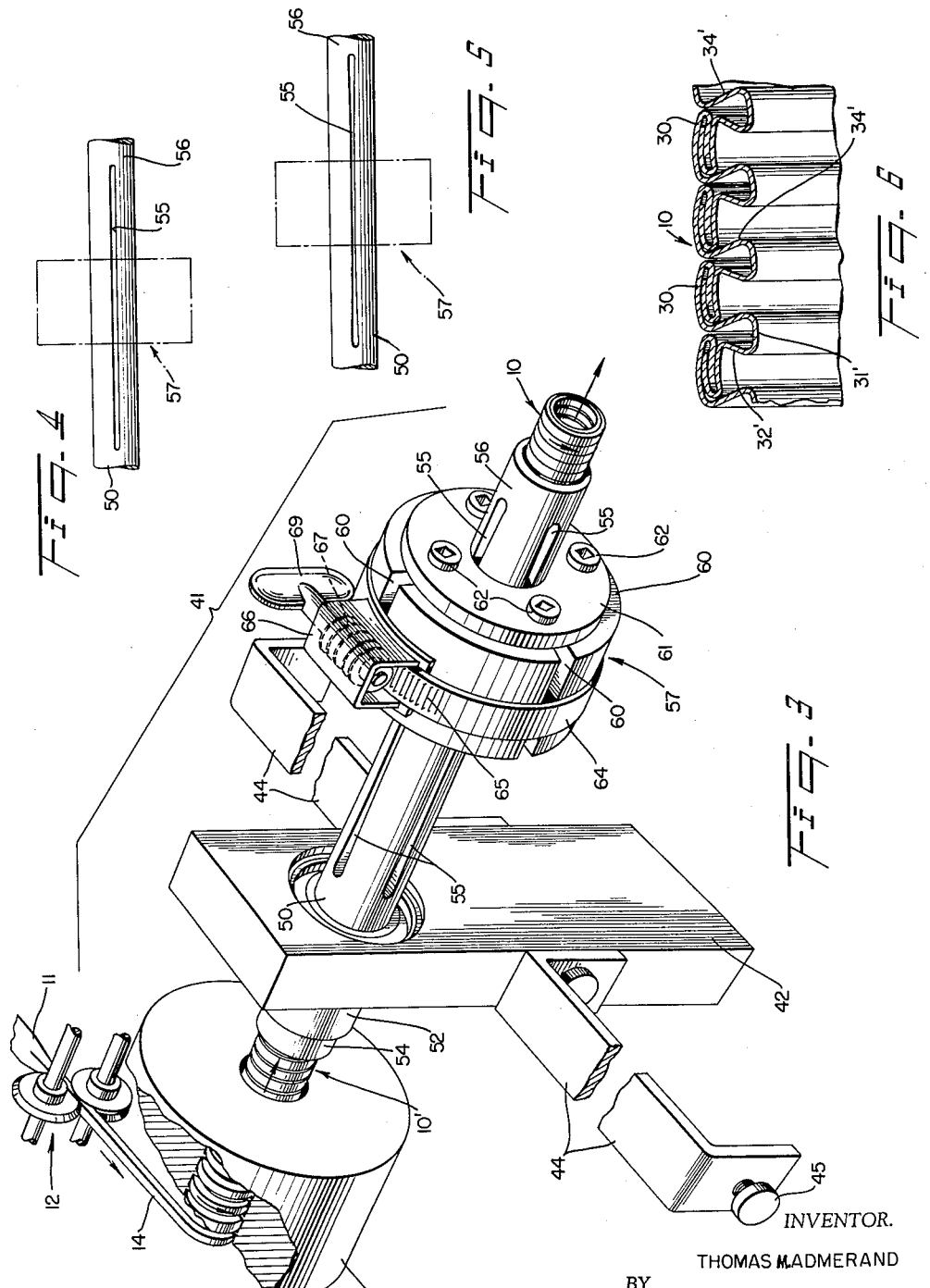

United States Patent Office 3,085,529
Patented Apr. 16, 1963

3,085,529
APPARATUS FOR FORMING FLEXIBLE CONDUIT
Thomas M. Admerand, Montrose, Pa., assignor to The Bendix Corporation, a corporation of Delaware
Filed Apr. 29, 1958, Ser. No. 731,718
6 Claims. (Cl. 113—35)

This invention relates to apparatus for forming flexible conduit, and more particularly relates to an improved apparatus for axially compacting flexible conduit of the multiple turn, edge-interlocked type.

The invention has among its objects the provision of a novel apparatus for axially compacting flexible conduit of the multiple turn, edge-interlocked type.

Other objects are the provision of a novel method of axially compacting a flexible conduit of the type indicated, and the provision of a novel method of forming and compacting such conduit.

Another object of the invention resides in the provision of an apparatus of the type indicated which continuously axially compacts said conduit as it travels axially.

Still another object of the invention is the provision of an apparatus, for axially compacting conduit, which is not limited as to the length of conduit which it can compact, so that the compacting of the conduit is not a factor in the length of a continuous conduit which may be produced.

Yet another object is the provision of a conduit-compacting apparatus which may advantageously be employed with a conduit assembling or winding apparatus.

Still another object is the provision of conduit compacting apparatus, of the type indicated immediately above, which utilizes the axial travel and thrust imposed upon the initially assembled or wound conduit to accomplish the compacting of the conduit.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a view in longitudinal axial section through an illustrative embodiment of conduit-compacting apparatus in accordance with the invention, such apparatus being shown with a conduit-winding apparatus, the latter apparatus being shown in a somewhat simplified manner, certain parts of the apparatus being shown in elevation;

FIG. 2 is an enlarged combined elevational and axial sectional view of the conduit as it is undergoing assembly or winding in the conduit winding apparatus, the changes in shape of the edge-interlocked joint between adjacent turns of the conduit wall being shown exaggerated for economy of space;

FIG. 3 is a fragmentary view in perspective of the combined conduit assembling and conduit compacting apparatus, the conduit assembling apparatus being shown in a somewhat simplified, diagrammatic manner;

FIG. 4 is a fragmentary view in elevation of the conduit compacting sleeve in its relaxed configuration;

FIG. 5 is a view similar to FIG. 4 but with the sleeve in a contracted condition in an intermediate zone thereof, and FIG. 6 is an enlarged combined elevational and axial sectional view of the conduit after it has been axially compacted.

The invention is described and illustrated herein in connection with the making of a flexible conduit of the type sometimes called "Titeflex" conduit, wherein the wall of the conduit is formed by winding up a suitably preformed metal strip so that the edges of adjoining turns of the strip in the conduit interlock with each other. As thus wound, the conduit is necessarily axially extended or uncompacted, the inner and outer peaks or lands of the turns lying markedly spaced from each other. Such condition of the conduit is shown at the right hand end of FIG. 2.

To produce a conduit wherein the inner wall has substantial continuity, and to strengthen the conduit against crushing forces while preserving a large measure of longitudinal flexibility in the conduit, the conduit is axially compacted after it has been assembled or wound. This produces a conduit such as shown in FIG. 6.

The axial compacting of the conduit has previously been carried out in a discontinuous manner. Thus after a predetermined length of conduit had been assembled or wound, such wound portion of the conduit was cut off from the portion thereof undergoing winding, the wound length of conduit was assembled on a mandrel, and the conduit was axially compressed by engaging its ends between suitable relatively advanceable compressing heads.

Not only was the practice of such method time and space consuming, but it limited the lengths of conduit which could be made, since it was not feasible to compress more than a certain length of conduit axially in the described manner.

The present invention overcomes the described difficulties and limitations of the prior apparatus. The apparatus of the invention requires little more space than is required by the conduit assembling or winding apparatus alone. The conduit compacting apparatus of the invention derives its required power and the relative motion required between the conduit and the conduit compacting means from the conduit assembling or winding apparatus. The conduit compacting apparatus imposes no limitation on the length of finished conduit which can be produced, since it functions continuously to compact the conduit as it is delivered from the assembling or winding apparatus.

Turning now to the drawings, the above described uncompacted conduit (at the right in FIG. 2) is generally designated therein by the reference character 10'; the finished, axially compacted conduit is indicated generally therein by the reference character 10. The conduit is assembled or wound in a conventional manner from a strip of metal 11, the strip being formed or bent transversely as it is fed to the winding apparatus by strip bending and feeding rolls schematically shown at 12. The thus formed strip of metal 14, having a cross section such as the left hand turn of the partially formed, uncompacted conduit shown in FIG. 2, is fed to a fixed strip winding and edge-interlocking die, generally designated 15.

As presented to the die, strip 14 is generally of channel shape, having an upwardly concave stepped portion 24 intermediate its sides, the trailing edge 22 of the strip (considered with respect to the forward direction of travel of the formed conduit) being inclined radially outwardly and rearwardly. The forward edge zone of the strip has a generally radial wall 25 with an inwardly directed fold 26 therein lying substantially the same distance from the axis of the preliminarily wound conduit as the outer edge of portion 22. From fold 26 the strip extends generally radially inwardly in a flange 27 spaced from wall 25 to form a channel which receives the outwardly extending trailing edge 22 of the last turn of the strip which has been wound into a preliminarily assembled conduit by die 15.

The die 15, which is convenitional in forming the conduit shown, is usually made of a plurality of superimposed plates each having a sutably shaped conduit winding and forming passage therethrough. The passages in successive plates function to interlock successive convolutions and deform them, in the manner depicted generally in FIG. 2, but in a much more gradual manner, as is evident from the number of convolutions of the conduit shown in FIG. 1 as lying within the entering, tapered zone 17 of the mandrel 16. Mandrel 16 is rotatably driven by means (not shown) engaging its left hand end. The frictional engagement between the mandrel and the inner surface 18 of die 15 causes the strip 14 to be gripped and to rotate with the mandrel in the die.

As the preliminarily wound strip and edge-interlocked convolutions of strip 14 travel to the right up the expanding taper of zone 17 of the mandrel, the edge-interlocked zones are progressively bent over in a forward direction so that they form tightly crimped joints 30 forming outer peaks of the conduit sidewall lying parallel to the axis of the conduit, the conduit having generally square sectioned helical channels 31 between successive peaks. The leading side wall 34 and the trailing sdiewall 32 of such channels lie generally radial of the conduit in such axially uncompacted, preliminarily formed conduit. The remainder of the wall of the die, beyond the larger end of tapered portion 17 of the mandrel performs relatively little further forming of the conduit, beyond that shown at the right hand end of FIG. 2, being mainly for interacting with the convolutions in the conduit to thrust it to the right. In such further zone of the die the mandrel portion 19 is circular cylnidrical.

Somewhat forwardly of die 15 the mandrel has a reduced diameter, circular cylindrical shape at its forward end 21, there being a shoulder 20 between the forward end of the mandrel and portion 19 thereof. The preliminarily formed, substantially uncompacted conduit 10' continues to travel to the right, and to rotate as it travels, and then enters the conduit compacting device 41 of the invention. Such device includes a vertical supporting standard 42, which is secured to a fixed frame part (not shown) of the apparatus by sidewardly projecting brackets 44. Brackets 44 are held on the frame by set screws, of which one is shown at 45. Positioned in support 42 coaxial of the mandrel is a thrust-sustaining bearing generally designated 46. Such bearing has an outer race 47 affixed in a seat 49 in support 42. The inner race 48 of the bearing serves to support a conduit-engaging and retarding sleeve 50. Such sleeve, which may be made for example of nylon, has a rear, thrust sustaining flange 52 thereon engaging the inner race of bearing 46. The preliminarily formed conduit, passing over a reduced zone 21 of the mandrel, enters the loosely fitting rear end of the passage in sleeve 50. To facilitate entry of the conduit into the sleeve, the sleeve is provided with a rearwardly projecting entrance guide portion 54.

Forwardly of supportnig member 42 the sleeve 50 is provided with a plurality of equally angularly spaced longitudinally extending slots 55. Four such slots are shown, the slots extending forwardly to a zone adjacent the forward end of the sleeve and terminating at an annular unslotted zone 56 of the sleeve. A sleeve compressing device, generally designated 57, is mounted upon the sleeve, generally intermediate the ends of slots 55, in order to deflect the side walls of the sleeve strongly into engagement with the outer surface of the conduit. The conduit is retarded within sleeve 50, during the travel of the conduit to the right, whereby said conduit is axially compacted. It will be apparent that the sleeve 50 and the sleeve compressing means 57 rotate with the conduit as the latter rotates in its travel to the right.

The sleeve compressing means 57 is composed of a central axially thick resilient sleeve 59, made for example of rubber, which has a plurality of radially extending slots 60 therein, the slots having a radial depth substantially less than the radial thickness of the rubber sleeve. A metal end plate 61 is provided at each end of sleeve 59, the assembly being held together by studs 62 which extends through holes in one end plate and are threaded into the other end plate. Studs 62 somewhat loosely engage the respective end plates, whereby the sleeve 59 may readily be deformed radially inwardly by the means now to be described.

A metal band 64, made for example of steel, encircles sleeve 59. One end of the band has fastened thereto a box-like hollow housing 66 within which is journalled a worm 67, as more clearly shown in FIG. 3. The worm, which is positioned tangentially of sleeve 59, may be turned on its axis by a winged head 69. The other end of band 64, which overlies the first said end of the band to which housing 66 is attached, is provided with a number of part-helical depressions 65 which intermesh with the lands on worm 67. It will be apparent that by turning worm 67 in the proper direction the resilient bushing or sleeve 59 may be compressed to varying degrees. In FIG. 4 such bushing is shown in substantially relaxed condition, whereby the slotted portion of sleeve 50 is deformed radially inwardly to only a slight degree. In this condition, sleeve 50 will impose only as small retardation upon the conduit as it travels to the right. When, however, the resilient bushing 57 is markedly compressed, it presses the slotted zone of sleeve 50 which it confronts radially inwardly to a marked degree, whereby strongly frictionally to retard the conduit in its travel. In general, it is desired to deform sleeve 50 radially inwardly only to that degree sufficient to frictionally retard the conduit being formed to cause it to assume the final condition thereof which is somewhat diagrammatically shown in FIG. 6.

In FIG. 6, the section of the finished conduit there shown, generally designated 10, has been axially compacted so that the helical seam-forming lands 30 thereof are in substantial contact. Such compacting of the conduits, as will be seen in that figure, has caused the channels between the lands, now designated 31', to have the radially outer zones of their side walls thrust toward each other so that they now form substantially walls of a triangular secitoned channel. In FIG. 6 such deformed side walls are there designated 32' and 34'.

It will be obvious that the conduit compacting apparatus and method of the invention display numerous advantages. Chief among them are their simplicity, their ease of operation, the fact that they require no substantial added space for their practice, and that they impose no limitation on the total length of conduit which may be continuously formed.

Although only one embodiment of conduit forming and conduit compacting apparatus and method has been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. In an apparatus for forming and axially delivering a flexible conduit formed from a continuous strip of formable material and having a plurality of edge-interlocked spiral convolutions, said apparatus comprising means for laying and interlocking the convolutions to form a conduit and for delivering the conduit in an axially extending path, said laying and interlocking means comprising a fixed laying and edge-interlocking die to which the strip of material is fed, and a rotatable driven conduit-shaping mandrel within the die, the conduit formed by the mandrel and die being rotated with the mandrel as it issues from the die, said laying and interlocking means exerting a strong conduit-forwarding thrust on the conduit, the peaks of the thus formed conduit being substantially spaced from each other axially of the conduit, and conduit compacting mechanism through which the thus formed conduit passes in its travel from said laying and interlocking means, the improved conduit compacting mechanism including means for receiving the conduit as it travels along said path and for continuously axially compacting the conduit as it travels, the means for compacting the conduit including an elongated guide held against travel along said path with the conduit and having a smooth walled passage therein receiving and encompassing to a substantial extent the conduit delivered from the laying and interlocking apparatus, the wall of the passage imposing a strong axially directed retarding force on the conduit whereby to force the peaks of the conduit closely together by strongly frictionally engaging the peaks of the conduit as the conduit passes through the guide, and means mounting the guide for free rotation by and in synchronism with the conduit issuing from the laying and interlocking means.

2. An apparatus as defined in claim 1, wherein the means mounting the guide comprises a fixed member mounted adjacent the path of the conduit as it issues from the laying and interlocking means, and bearing means mounted on the fixed member and journalling the elongated guide therein.

3. An apparatus as defined in claim 2, wherein the guide comprises a plurality of longitudinally disposed elongated members angularly spaced about and forming the wall of said passage, the ends of the elongated members at the end of the guide which the conduit enters being connected together, said entering end of the guide being journalled in the bearing means, and means to adjust portions of the elongated members lying in a transverse zone appreciably spaced from the bearing means radially inwardly and outwardly.

4. In an apparatus for forming and axially delivering a flexible conduit formed from a continuous strip of formable material and having a plurality of edge-interlocked spiral convolutions, said apparatus comprising means for laying and interlocking the convolutions to form a conduit and for delivering the conduit in an axially extending path, said laying and interlocking means comprising a fixed laying and edge-interlocking die to which the strip of material is fed, and a rotatable driven conduit-shaping mandrel within the die, the conduit formed by the mandrel and die being rotated with the mandrel as it issues from the die, said laying and interlocking means exerting a strong conduit-forwarding thrust on the conduit, the peaks of the thus formed conduit being substantially spaced from each other axially of the conduit, and conduit compacting mechanism through which the thus formed conduit passes in its travel from said laying and interlocking means, the improved conduit compacting mechanism including means for receiving the conduit as it travels along said path and for continuously axially compacting the conduit as it travels, the means for compacting the conduit including an elongated guide having a smooth walled passage therein receiving and encompassing to a substantial extent the conduit delivered from the laying and interlocking apparatus, the wall of the passage imposing a strong axially directed retarding force on the conduit whereby to force the peaks of the conduit closely together by strongly frictionally engaging the peaks of the conduit as the conduit passes through the guide, the guide comprising a plurality of longitudinally disposed elongated resilient members angularly spaced about and forming the wall of the passage, said elongated members being connected at at least one end, means embracing the elongated members and exerting an inwardly directed force thereon at a transverse zone of the guide, said last-named means comprising a resilient annular member disposed around the elongated members, and means adjustable to compress the annular member against the elongated members, and means mounting the guide for rotating with the conduit issuing from the laying and interlocking means.

5. In an apparatus for forming and axially delivering a flexible conduit formed from a continuous strip of formable material and having a plurality of edge-interlocked spiral convolutions, said apparatus comprising means for laying and interlocking the convolutions to form a conduit and for delivering the conduit in an axially extending path, said laying and interlocking means comprising a fixed laying and edge-interlocking die to which the strip of material is fed, and a rotatable driven conduit-shaping mandrel within the die, the conduit formed by the mandrel and die being rotated with the mandrel as it issues from the die, said laying and interlocking means exerting a strong conduit-forwarding thrust on the conduit, the peaks of the thus formed conduit being substantially spaced from each other axially of the conduit, and conduit compacting mechanism through which the thus formed conduit passes in its travel from said laying and interlocking means, the improved conduit compacting mechanism including means for receiving the conduit as it travels along said path and for continuously axially compacting the conduit as it travels, the means for compacting the conduit including an elongated guide having a smooth walled passage therein receiving and encompassing to a substantial extent the conduit delivered from the laying and interlocking apparatus, the wall of the passage imposing a strong axially directed retarding force on the conduit whereby to force the peaks of the conduit closely together by strongly frictionally engaging the peaks of the conduit as the conduit passes through the guide, said elongated guide comprising a resilient conduit-receiving tube separated intermediate its ends into a plurality of elongated longitudinally disposed members angularly spaced about the tube to form the sidewall thereof, means adjustably to bow the members inwardly at an intermediate zone transverse to the length thereof whereby to constrict the passage through the tube, and means mounting the guide for rotation with the conduit issuing from the laying and interlocking means.

6. A conduit-compacting apparatus as defined in claim 3, wherein the tube is formed of a plastic material.

References Cited in the file of this patent

UNITED STATES PATENTS

| 1,155,589 | McDonald | Oct. 5, 1915 |
| 1,597,404 | Crossley | Aug. 24, 1926 |
| 2,033,717 | Kopetz | Mar. 10, 1936 |
| 2,375,574 | Metheny et al. | May 8, 1945 |
| 2,383,253 | Ingalls | Aug. 21, 1945 |
| 2,657,617 | Hussnigg | Nov. 3, 1953 |
| 2,734,472 | Bornand | Feb. 14, 1956 |
| 2,772,646 | Padgett | Dec. 4, 1956 |

FOREIGN PATENTS

| 647,513 | Great Britain | Dec. 13, 1950 |